US012703420B2

(12) United States Patent
Noerenberg

(10) Patent No.: US 12,703,420 B2
(45) Date of Patent: Aug. 11, 2026

(54) STEERING SYSTEM FOR USE IN TURNING STEERABLE VEHICLE WHEELS

(71) Applicant: ZF FRIEDRICHSHAFEN AG, Friedrichshafen (DE)

(72) Inventor: Ryan Noerenberg, Krefeld (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 465 days.

(21) Appl. No.: 18/359,325

(22) Filed: Jul. 26, 2023

(65) Prior Publication Data

US 2025/0033690 A1 Jan. 30, 2025

(51) Int. Cl.
*B62D 5/00* (2006.01)
*B62D 5/04* (2006.01)

(52) U.S. Cl.
CPC ........... *B62D 5/008* (2013.01); *B62D 5/0427* (2013.01)

(58) Field of Classification Search
CPC ........ B62D 5/008; B62D 5/0427; B62D 3/10; B62D 5/0421
See application file for complete search history.

(56) References Cited

U.S. PATENT DOCUMENTS

| | | | | |
|---|---|---|---|---|
| 6,575,265 | B2 * | 6/2003 | Richardson | B62D 5/008 180/444 |
| 11,498,616 | B2 | 11/2022 | Boyle et al. | |
| 2006/0052201 | A1 | 3/2006 | Augustine et al. | |
| 2006/0166771 | A1 * | 7/2006 | Yamanaka | B62D 5/008 475/4 |
| 2006/0183589 | A1 * | 8/2006 | Naka | B62D 5/008 475/30 |
| 2008/0242465 | A1 * | 10/2008 | Strobel | B62D 5/008 180/444 |
| 2019/0092374 | A1 * | 3/2019 | Nofzinger | B62D 5/006 |
| 2022/0204072 | A1 * | 6/2022 | Boyle | B62D 5/0421 |
| 2024/0116561 | A1 * | 4/2024 | Schoon | F16H 37/124 |

FOREIGN PATENT DOCUMENTS

| | | | | | |
|---|---|---|---|---|---|
| CN | 111186478 | A * | 5/2020 | | B62D 5/0421 |
| DE | 102009056356 | A1 * | 6/2011 | | B62D 5/0448 |
| DE | 102021213067 | A1 * | 5/2023 | | B62D 7/02 |
| DE | 102023211544 | A1 * | 6/2024 | | B62D 6/00 |
| EP | 1605185 | A2 | 11/2014 | | |
| EP | 2808230 | A1 * | 12/2014 | | B62D 5/04 |
| WO | 2002/103221 | A1 | 12/2002 | | |
| WO | WO-2006072186 | A1 * | 7/2006 | | F16H 35/008 |

* cited by examiner

*Primary Examiner* — Drew J Brown
(74) *Attorney, Agent, or Firm* — Tarolli, Sundheim, Covell & Tummino LLP

(57) ABSTRACT

A steering system for use in turning steerable vehicle wheels includes a gear in a housing and rotatable relative to the housing via an electric motor. A planetary gear stage is in the housing and has a sun gear, a planetary gear meshed with the sun gear, and a carrier connected to the planetary gear. Rotation of the gear urges the sun gear to rotate about an axis. Rotation of the sun gear urges the planetary gear to rotate relative to the housing and orbit the sun gear. The carrier is urged to rotate about the axis in response to the planetary gear rotating relative to the housing and orbiting the sun gear. A bearing has a first race on the gear and a second race on the carrier. The gear and the carrier are rotatably supported in the housing on one another via the bearing.

20 Claims, 10 Drawing Sheets

STEERING SYSTEM FOR USE IN TURNING STEERABLE VEHICLE WHEELS

TECHNICAL FIELD

The present invention relates to a steering system for use in turning steerable vehicle wheels.

BACKGROUND OF THE INVENTION

A known vehicle steering system includes a gearbox and a motor. The gearbox includes an output shaft which is rotatable to affect turning movements of steerable vehicle wheels. A pinion is operably connected to the output shaft such that rotation of the pinion about a rotational axis causes the output shaft to rotate. The pinion is rotatably supported in the gearbox on two ball bearings that are aligned along the rotational axis of the pinion. A steering column interconnects the pinion and a vehicle steering wheel.

In addition, the motor is operable to affect rotation of the output shaft in order to provide steering assist. The motor is operably connected to the output shaft via one or more planetary gear stages that are mounted in the gearbox. An output shaft of the motor, the output shaft and each planetary gear stage are all aligned along a single axis in the gearbox. A steering system having this general construction is disclosed in U.S. Pat. No. 11,498,616.

SUMMARY OF THE INVENTION

According to an aspect of the invention, alone or in combination with any other aspect, a steering system for use in turning steerable vehicle wheels comprises a housing and an electric motor. A gear is in the housing and is rotatable relative to the housing via the electric motor. A planetary gear stage is in the housing. The planetary gear stage has a sun gear, a planetary gear meshed with the sun gear, and a carrier connected to the planetary gear. Rotation of the gear urges the sun gear to rotate about an axis. Rotation of the sun gear urges the planetary gear to rotate relative to the housing and orbit the sun gear. The carrier is urged to rotate about the axis in response to the planetary gear rotating relative to the housing and orbiting the sun gear. A bearing has a first race on the gear and a second race on the carrier. The gear and the carrier are rotatably supported in the housing on one another via the bearing.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION

Figure 1:
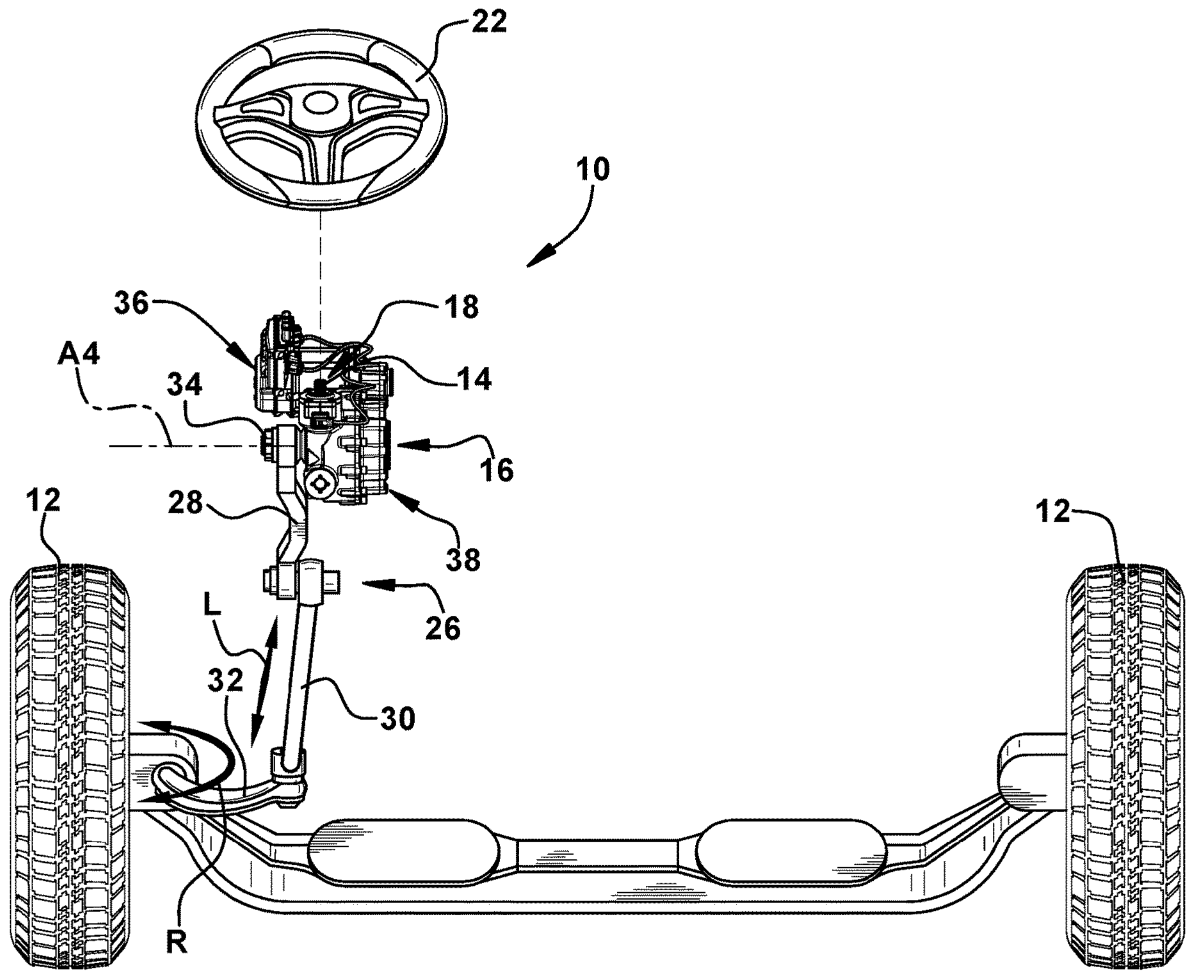
FIG. 1 is a schematic rear view of an example steering system for use in turning steerable vehicle wheels.
Figure 3:
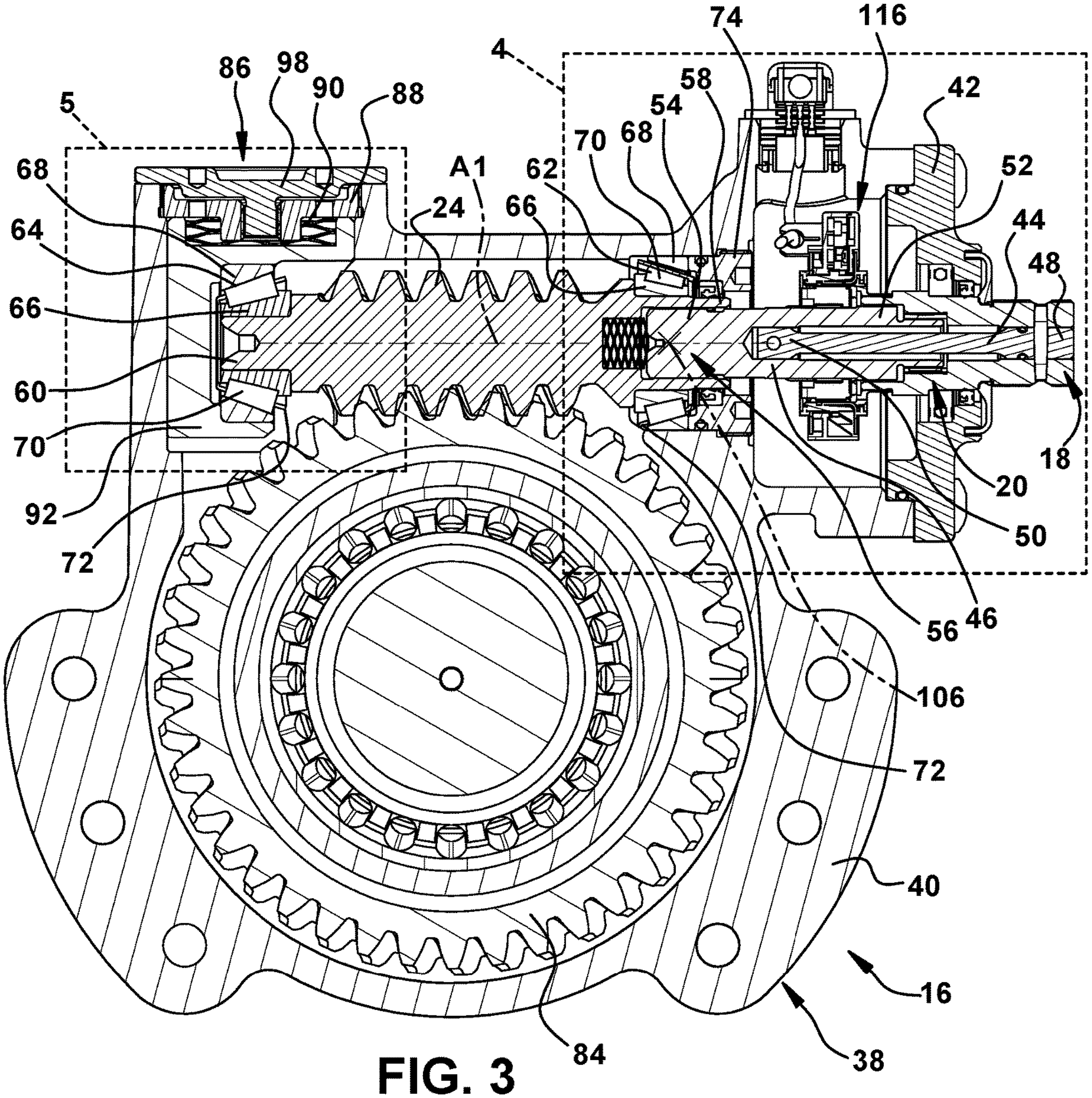
FIG. 3 is a cross-sectional view taken along line 3-3 of FIG. 2.

The present invention relates to a steering system for use in turning steerable vehicle wheels. An example steering system 10 for use in turning steerable vehicle wheels 12 is schematically illustrated in FIG. 1. The steering system 10 can be, e.g., used in a commercial vehicle. The steering system 10 includes a input shaft 14 and an electrically powered steering unit ("EPS unit") 16 for providing steering assist. The input shaft 14 extends from a first end 18 to a second end 20 (FIG. 3). A steering wheel 22 is connected to the first end 18. For example, the steering wheel 22 may be connected to the first end 18 via a steering column, one or more shafts, one or more joints (e.g., universal joints), or any combination thereof. A pinion 24 (FIG. 3) is connected to or provided on the second end 20. Rotation of the steering wheel 22 transmits torque through the input shaft 14 to the pinion 24. In other words, the pinion 24 is urged to rotate under the influence of torque transmitted through the input shaft 14.

A steering linkage 26 is connected to the steerable vehicle wheels 12. As shown, the steering linkage 26 includes first, second and third steering members 28, 30, 32. The first steering member 28 is connected to an output shaft 34 of the EPS unit 16. The first steering member 28 can be, for example, a pitman arm. The second steering member 30 is connected to the first steering member 28 and can be, for example, a drag link. The third steering member 32 is connected to the second steering member 30 and one of the steerable wheels 12. The third steering member 32 can be, for example, a steering arm.

Figure 2:
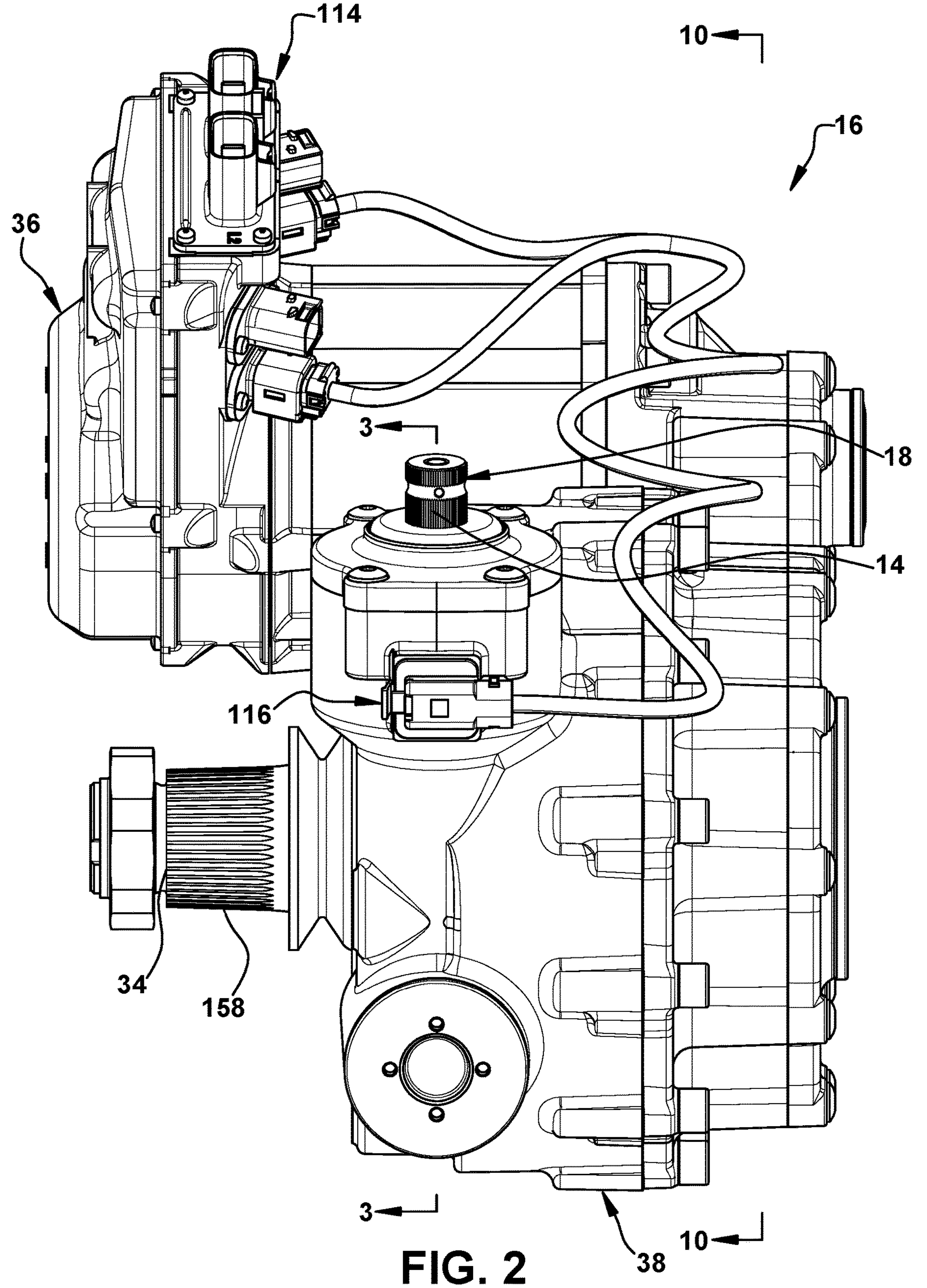
FIG. 2 is a rear view of an EPS unit of the steering system of FIG. 1.

The EPS unit 16 provides steering assist by affecting movement of the steering linkage 26—and therefore the steerable wheels 12—in response to rotation of the steering wheel 22. Referring further to FIG. 2, the EPS unit 16 includes an electric motor 36 (e.g., a reversible electric motor) and a gearbox 38 connected to the motor.

As shown in FIG. 3, the gearbox 38 has a housing 40 in which the pinion 24 is rotatably supported. The housing 40 may be formed as a single monolithic piece or assembled from separate subcomponents. A cap 42 is connected to the housing 40 and receives the input shaft 14 in a manner that allows for relative rotation therebetween. The first end 18 of the input shaft 14 may thus be external to the housing 40, while the second end 20 may be inside the housing 40. A torsion bar 44 and an output shaft 46 help transfer rotation of the second end 20 of the input shaft 14 to the pinion 24. The input shaft 14, the torsion bar 44 and the output shaft 46 may be coaxial with one another.

The torsion bar 44 extends within the input shaft 14 and the output shaft 46. A first end 48 of the torsion bar 44 is fixed for rotation with the input shaft 14, while a second end 50 of the torsion bar is fixed for rotation with the output shaft 46. When the input shaft 14 is rotated by the steering wheel 22, the torsion bar 44 permits a prescribed amount of relative rotation between the input shaft and the output shaft 46 before the input shaft and the output shaft rotate together.

The output shaft 46 has a first end 52 that extends into the second end 20 of the input shaft 14. A second end 54 of the output shaft 46 extends into a recess 56 of the pinion 24. The second end 54 may engage with the pinion 24 (e.g., via splines) in such a matter that rotation of the output shaft 46 is transferred to the pinion. Therefore, rotation of the output shaft 46 responsively causes or urges the pinion 24 to rotate about a rotational axis A1 of the pinion (also referred to herein as "a first rotational axis") relative to the housing 40.

First and second ends 58, 60 of the pinion 24 are each rotatably supported in the housing 40 by a bearing 62, 64. Each bearing 62, 64 is a tapered roller bearing having an inner race or cone 66 circumferentially engaging the pinion 24, an outer race or cup 68 circumferentially engaging an inner surface of or in the housing 40, and a plurality of tapered rollers 70 interposed radially between the cone and the cup. The cones 66 may be rotationally fixed to the pinion 24, while the cups 68 may be rotationally fixed to their respective inner surfaces. The cones 66 thus may rotate relative to the cups 68 as the pinion 24 rotates relative to the housing 40. Each bearing 62, 64 may also include a cage 72 for their respective tapered rollers 70. Although each bearing 62, 64 is shown as being a tapered roller bearing, at least one of the bearings 62, 64 may be any other desired bearing such as, for example a ball bearing, an angular contact ball bearing, a spherical roller bearing, a cylindrical roller bearing and a needle roller bearing.

Figure 4:
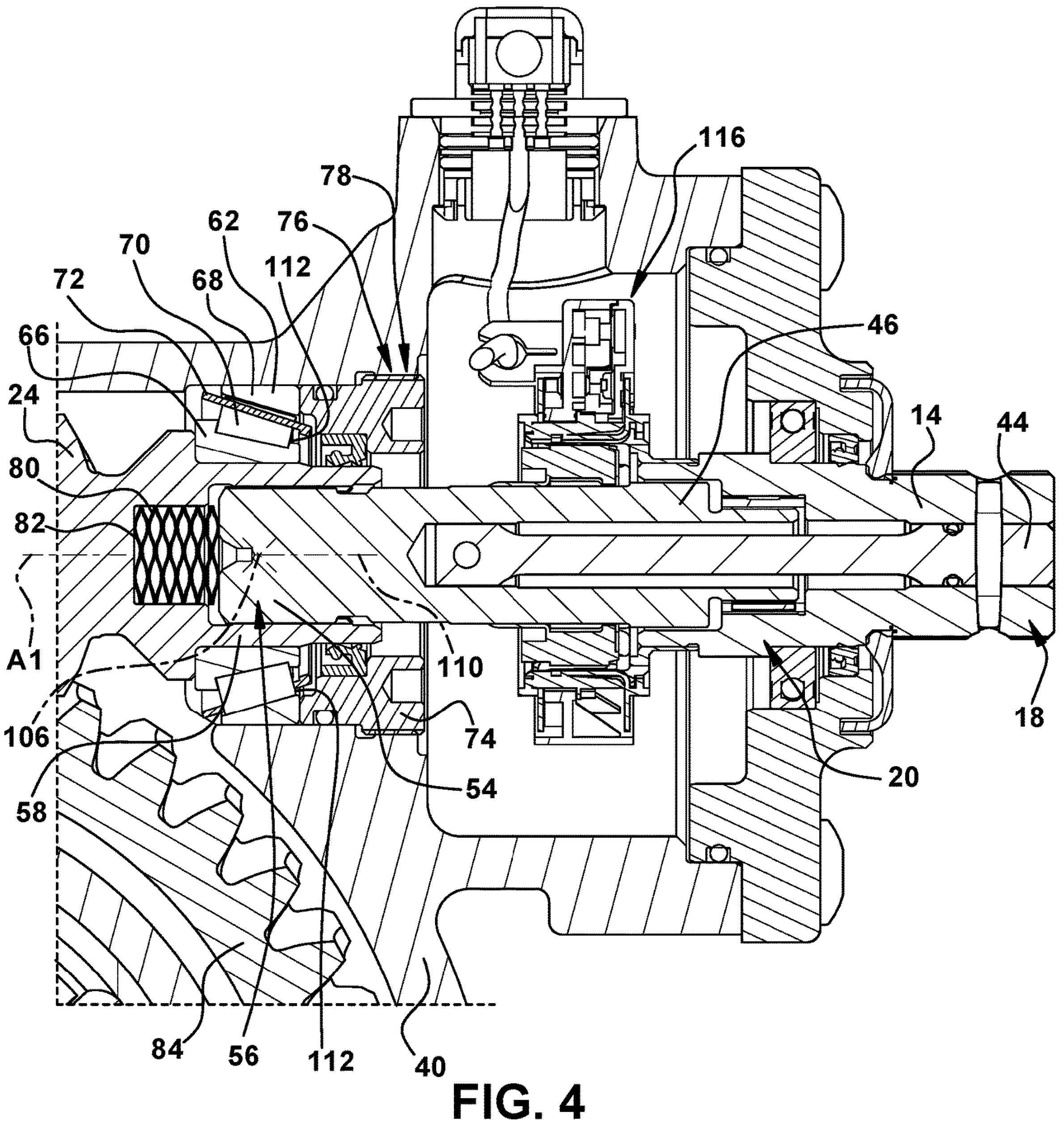
FIG. 4 is an isolated view of portion 4 of FIG. 3.

A preload of each bearing 62, 64 may be adjusted via a bearing adjuster 74. As shown in FIGS. 3-4, the bearing adjuster includes external threads 76 for threadably engaging internal threads 78 of the housing 40. The bearing adjuster 74 may be substantially cylindrical such that at least one of the first end 58 of the pinion 24 and the second end 54 of the output shaft 46 may extend into and/or through the bearing adjuster 74.

The bearing adjuster 74 may be in contact with or brought into contact with the cup 68 of the bearing 62. When in contact with the cup 68, threading/screwing in the bearing adjuster 74 (i.e., driving the bearing adjuster toward the bearing 64) urges the cup 68 of the bearing 62 toward the other bearing 64 relative to the cone 66 of the bearing 62. Such relative movement reduces one or more clearances between the elements of the bearing 62 and, thus, increases the preload of the bearing 62. In contrast, threading/screwing out the bearing adjuster 74 (i.e., driving the bearing adjuster away from the bearing 64) increases the clearances and reduces the preload of the bearing 62.

Via the bearing 62, threading/screwing in the bearing adjuster 74 also urges the pinion 24 to move along the first rotational axis A1 toward the bearing 64. Such movement urges the cone 66 of the bearing 64 away from the bearing 62 relative to the cup 68 of the bearing 64, which reduces one or more clearances between the elements of the bearing 64 and increases the preload of the bearing 64. In contrast, threading/screwing out the bearing adjuster 74 increases the clearances and reduces the preload of the bearing 64.

The amount of torque needed to rotate the pinion 24 about its rotational axis A1 at least partially corresponds to the level of preload in the bearings 62, 64. In particular, increasing the preload increases the amount of torque needed to rotate the pinion 24. This is because the friction between the elements of the bearings 62, 64 increases as the preload(s) in the bearings increases.

Therefore, the bearing preload(s) and the pinion's "torque-to-rotate" may be set or adjusted as desired by threading/screwing in or out the bearing adjuster 74. In certain gearbox 38 configurations, it may be beneficial to have a relatively high torque-to-rotate value for the pinion 24. This is at least in part because having a high torque-to-rotate value and preload reduces the amount of noise, vibration, and/or harshness ("NVH") in the gearbox 38. For example, when the bearings 62, 64 have a high preload, the pinion 24 may be substantially prevented from being undesirably thrust axially (e.g., along its rotational axis A1) in response to a change in rotational direction of the pinion and/or in response to impact forces. An axially thrusted pinion 24 has the potential to cause or increase the NVH in the gearbox.

However, in other gearbox configurations, such as in the gearbox 38 configuration depicted in the Figures, a relative low torque-to-rotate value is desirable. The gearbox 38, being a low torque-to-rotate system, may include features for reducing NVH. For example, as shown in FIGS. 3-4, the gearbox 38 may include an elastic element 80 positioned in the recess 56 of the pinion 24. The elastic element 80 extends between a bottom 82 of the recess 56 and the second end 54 of the output shaft 46. Although the elastic element 80 directly contacts each of the pinion 24 (e.g., at the bottom 82 of the recess 56) and the output shaft 24, certain gearbox 38 configurations may include one or more intermediate elements interposed between the elastic element and at least one of the pinion and the output shaft. The elastic element 80 may be a wave spring, a coil spring, or any other suitable spring.

The elastic element 80 may be at least partially compressed between the pinion 24 and the output shaft 46 so that the elastic element applies a predetermined axial force to the pinion in a direction away from the output shaft. The axial loading of the pinion 24 reduces/dampens any of the pinion's axial movements. Dampening the axial movements of the pinion 24 eliminates or at least reduces the NVH in the gearbox 38 to an acceptable level without having to increase the bearings' preload and/or the torque-to-rotate value of the pinion 24.

As shown in FIG. 3, the pinion 24 may be in the form of or include a worm shaft that is meshingly engaged to a worm wheel 84 such that rotation of the pinion responsively rotates or urges the worm wheel to rotate relative to the housing 40. The worm wheel 84 may be operatively connected to the output shaft 34. Therefore, rotation of the steering wheel 22 transmits torque to the output shaft 34 through the input shaft 14, the pinion 24 and the worm wheel 84. The output shaft 34 thus may rotate or be urged to rotate under the influence of torque originating from the steering wheel 22.

Figure 5:
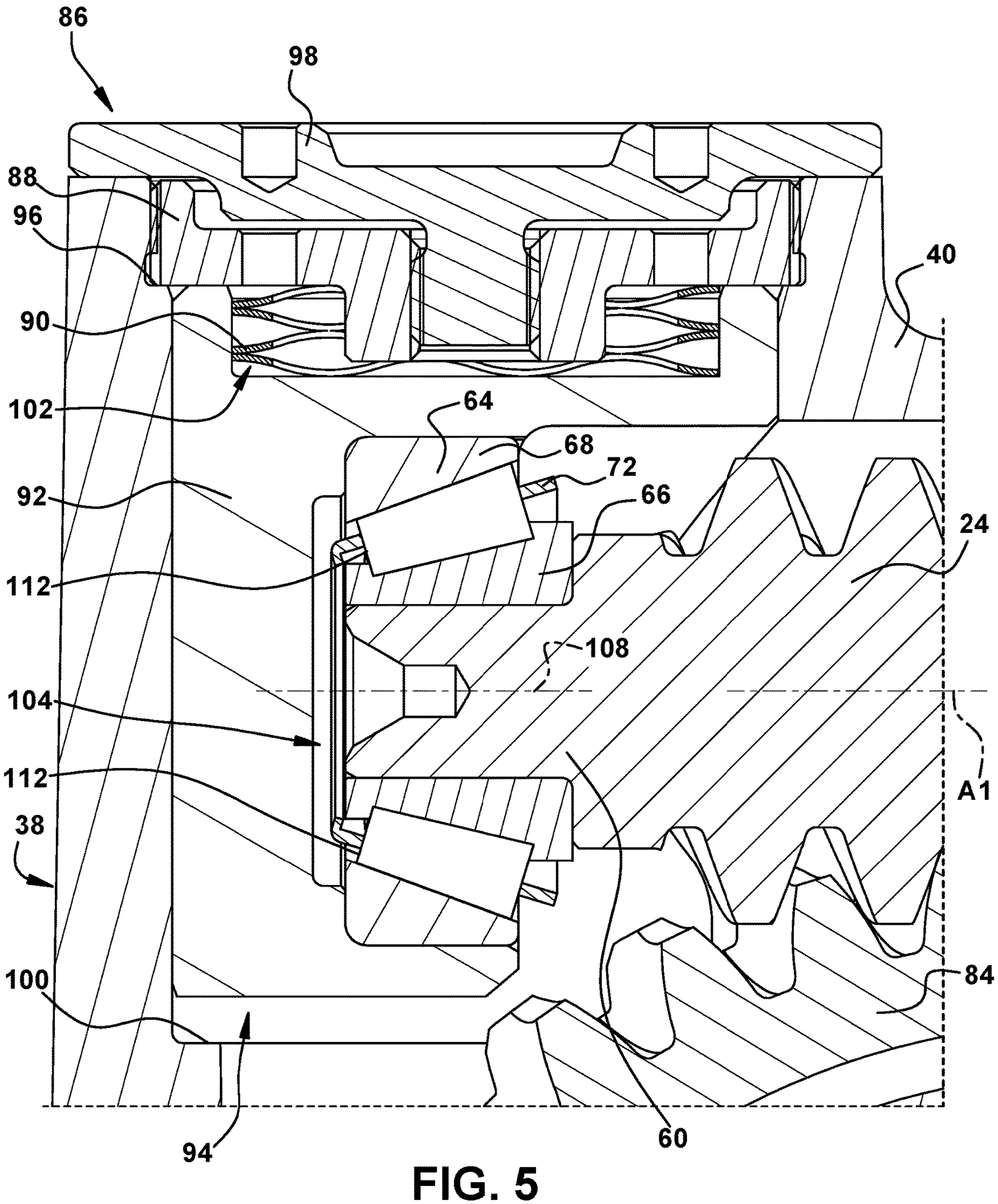
FIG. 5 is an isolated view of portion 5 of FIG. 3.

The pinion 24 may be urged by a pressing force toward the worm wheel 84 via a pressing device 86 of the gearbox 38. As shown in FIGS. 3 and 5, the pressing device 86 includes a reaction plate 88, an elastic element 90 and a plunger 92 inserted in a recess 94 of the housing 40. The reaction plate 88 abuts both a first shoulder 96 of the housing 40 one side and a cap 98, which closes the recess 94, on the other side. The reaction plate 88 may include external threads for threadably engaging internal threads of the housing 40. The reaction plate 88 thus is substantially prevented from undesirably moving relative to the housing 40.

The elastic element 90 extends between the reaction plate 88 and the plunger 92. Although the elastic element 90 directly contacts each of the reaction plate 88 and the plunger 92, certain pressing device 86 configurations may include one or more intermediate elements interposed between the elastic element and at least one of the reaction plate and the plunger. The elastic element 90 may be a wave spring, a coil spring, or any other suitable spring.

The plunger 92 is moveable in the recess 94 relative to the housing 40. For example, the plunger 92 can move along the recess 94 toward and away from the worm wheel 84 in a direction that is transverse to the first rotational axis A1.

However, the geometries of the recess/housing 94/40 and the plunger 92 may be configured to substantially restrict the plunger to movements in the direction that is transverse to the first rotational axis A1. Furthermore, these movements of the plunger 92 may be bound by the reaction plate 88 on one end and a second shoulder 100 of the housing 40 on the other end.

The plunger 92 includes a first recess 102 that substantially faces in a direction that is transverse to the first rotational axis A1. The elastic element 90 is positioned in (e.g., entirely within) the first recess 102. At least one of the reaction plate 88 and the cap 98 may also extend into the first recess 102. The elastic element 90 is at least partially compressed between the reaction plate 88 and the plunger 92 so that the elastic element provides the pressing force (generated via the elastic element's internal bias) to the plunger that urges the plunger away from the reaction plate.

The plunger 92 also includes a second recess 104 that substantially faces in the direction of the first rotational axis A1. The cup 68 of the bearing 64 circumferentially engages an inner surface of the plunger 92 in second recess 104 such that the bearing 64 moves toward and away from the worm wheel 84 together with the plunger. The bearing 64 thus takes the form of a "floating bearing" that is moveable toward and away from the worm wheel 84 in a direction that is transverse to the first rotational axis A1. The bearing 62, on the other hand, is a "fixed bearing" in that it is mounted in the housing 40 such that it is substantially prevented from moving toward and away from the worm wheel 84 relative to the housing 40.

The pressing force of the elastic element 90 urges the plunger 92 and the bearing 64 away from the reaction plate 88 and toward the worm wheel 84. The second end 60 of the pinion 24, being supported by the bearing 64, is urged toward the worm wheel 84 by the bearing 64. As the second end 60 is urged toward the worm wheel 84, the second end 60 pivots about a pivot axis 106 defined by the bearing 62 toward the worm wheel until the pinion 24 tightly meshes with the worm wheel. The pressing force generated by the elastic element 90 thus causes or urges the second end 60 of the pinion 24 to pivot about the pivot axis 106 until the pinion is in tight mesh with the worm wheel 84.

Because the bearing 64 moves relative to the housing 40 under the pressing force, the bearings 62, 64 are intentionally misaligned (i.e., not coaxial) by at least a small margin when the pinion 24 and the worm wheel 84 are tightly meshed. For example, a cup axis 108 of the cup 68 of bearing 64 may be offset in a direction that is transverse to the first rotational axis A1 with respect to a cup axis 110 (FIG. 4) of bearing 62. Furthermore, because of its pivoting movement, the rotational axis A1 of the pinion 24 is at a non-zero degree angle with respect to the cup axis 110 of bearing 62.

The mounting arrangement of the bearings 62, 64 may be selected in view of their intentional misalignment. In other words, it may be beneficial arrange the bearings 62, 64 in a manner that is relatively less sensitive to bearing misalignment. An example of such a mounting arrange is a direct mounting arrangement. The bearings 62, 64, as shown in FIGS. 3-5, can thus be arranged a direct mounting arrangement. Therefore, each bearing 62, 64 is arranged such that the small ends 112 of its tapered rollers 70 are pointed "outwards" or away from the other bearing 62, 64.

Torque transferred from the steering wheel 22 to the pinion 24 may create separating forces between the pinion 24 and worm wheel 84 that urge the pinion to pivot away from the worm wheel. The pressing force of the elastic element 90 is configured to overcome low separating forces (i.e., separating forces that are at or below a predetermined separating force) and maintain the pinion 24 tightly meshed to the worm wheel 84. Low separating forces may be generated by steering wheel torques that are at or below a predetermined torque. Therefore, when the steering wheel torque is at or below the predetermined torque, the pinion 24 and the worm wheel 84 are maintained in tight mesh. The internal stress of the bearings 62, 64 due to their misalignment is within an acceptable range while steering wheel torque remains low.

However, the internal stress of the misaligned bearings 62, 64 may increase as the steering wheel torque rises above the predetermined torque threshold. To combat this potential internal stress increase, the pressing device 86 may be configured such that the pressing force of the elastic element 90 is overcome by high separating forces (i.e., separating forces that are above the predetermined separating force). High separating forces may be generated by steering wheel torques that are above the predetermined torque. These high separating forces thus urge the pinion 24 (e.g., the second end 60 thereof) to at least partially pivot away from the worm wheel 84 to a position in which the bearings 62, 64 are aligned with one another. In other words, the high separating forces urge the second end 60 of the pinion 24 to pivot to a position in which the cup axes 108, 110 are coaxial. Aligning the bearings 62, 64 at least partially reduces the internal stress of the bearings and, thus, helps maintain the internal stress of the bearings within the acceptable range under high steering wheel torques. The rotational axis A1 of the pinion 24 may also be coaxial with the cup axes 108, 110, the input shaft 14, the torsion bar 44 and the output shaft 46 as a result of being pivoted by the high separating forces.

The gearbox 38 may be configured such that the second end 60 of the pinion 24 can only be pivoted away from the worm wheel 84 by the separating forces until the plunger 92 abuts the reaction plate 88. The maximum distance that the second end 60 of the pinon 24 can be pivoted away from the worm wheel 84 can thus be defined by the maximum distance the plunger 92 can travel toward the reaction plate 88. Furthermore, the gearbox 38 may be configured such that the cup axes 108, 110 are coaxial when the plunger 92 contacts the reaction plate 88.

The pressing force of the elastic element 90 overcomes the separating forces and pivots the pinion 24 back into tight mesh with the worm wheel 84 once the steering wheel torque returns to or below the predetermined torque threshold. Additionally, the pressing force may also compensate for wear of the teeth of the pinion 24 and/or the worm wheel 84 wear by urging the pinion to pivot further toward the worm wheel as the teeth of the pinion and/or the worm wheel wear. Therefore, the tight meshing engagement between the pinion 24 and worm wheel 84 can be maintained by the pressing force even as the teeth of the pinion and/or the worm wheel wear.

The maximum distance that the second end 60 of the pinon 24 can be pivoted toward the worm wheel 84 (e.g., to compensate for wear) can be defined by the maximum distance the plunger 92 can travel toward the worm wheel. Therefore, the pinion 24 can be pivoted toward the worm wheel 84 until the pinion tightly meshes with the worm wheel and/or until the plunger 92 contacts the second shoulder 100.

While the gearbox of FIGS. 3-5 is shown as having both the elastic element 80 and the pressing device 86, the gearbox 38 may be configured to include only one or none of the elastic element 80 and the pressing device 86.

As shown in FIGS. 2-3, the steering system 10 further includes a controller 114 and one or more vehicle condition sensors 116 that cooperate to control the EPS unit 16 based on sensed vehicle conditions. In one example, the vehicle condition sensors 116 can include a torque sensor and/or a position sensor electrically connected to the controller 114. The torque sensor, when provided, senses the torque applied to the steering wheel 22 and generates a signal indicative of the torque. The position sensor, when provided, senses the rotational position of the steering wheel 22 and generates a signal indicative of the steering wheel position. It will be appreciated that the vehicle condition sensors 116 can be positioned inside the housing 40 (as is shown in FIG. 3) or outside the housing.

The signals from the vehicle condition sensors 116 are sent to the controller 114. The controller 114 analyzes the outputs of the vehicle condition sensors 116 and affects operation of the motor 36 of the EPS unit 16 as a function of the output of the sensors. It is also contemplated that only the torque measurements or only the steering wheel position measurements may be used to affect operation of the motor 16. The controller 114 can also have inputs that vary as a function of sensed lateral acceleration of the vehicle or other vehicle operating conditions. In any case, the signals received by the controller 114 dictate the speed and/or torque of the motor 36 and thereby dictate the speed and torque transferred by an output shaft 118 (FIG. 6) of the motor to the gearbox 38 to assist in turning of the steerable vehicle wheels 12.

Figure 6:
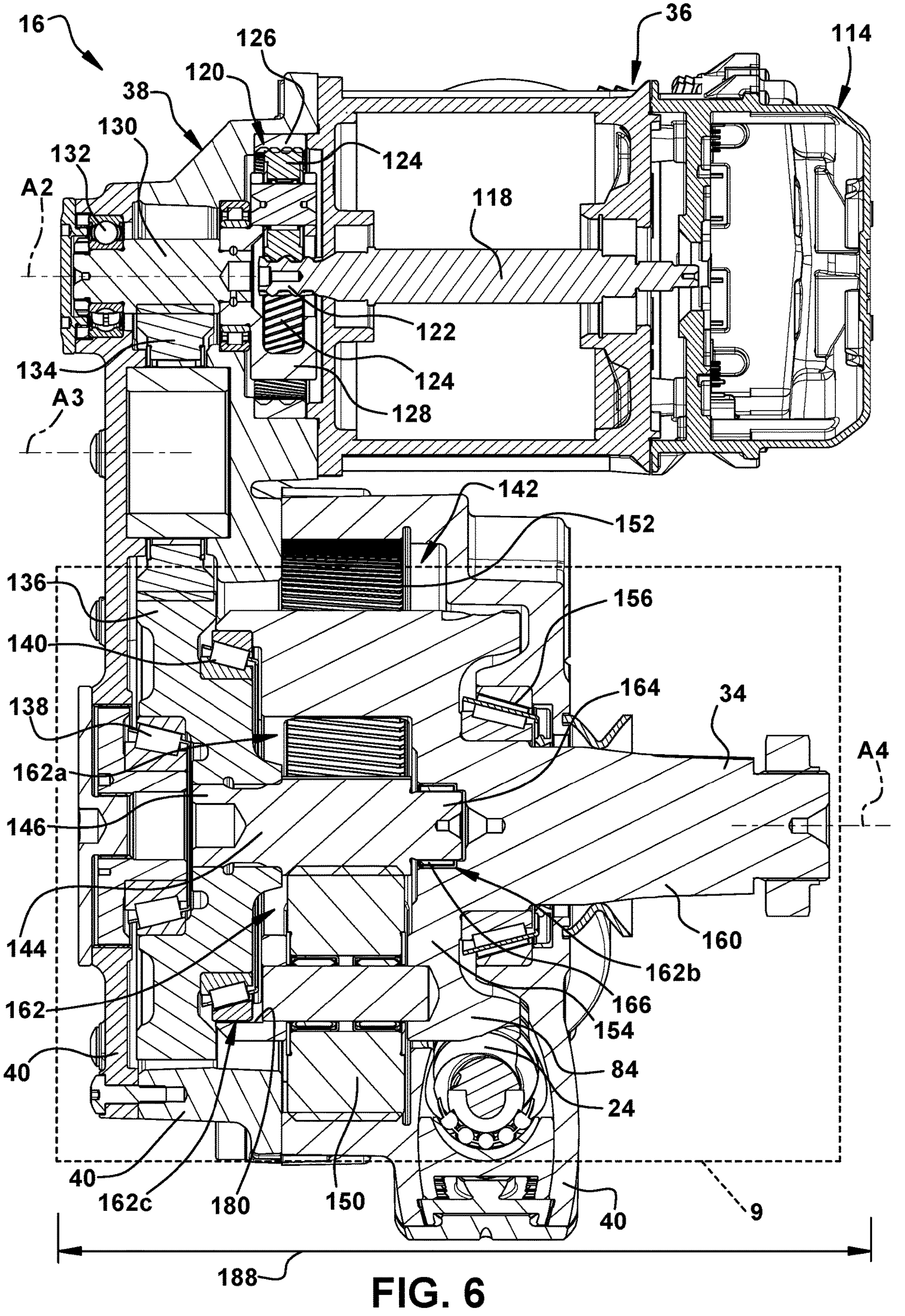
FIG. 6 is a cross-sectional view of a portion of the EPS unit of FIG. 2.
Figure 7:
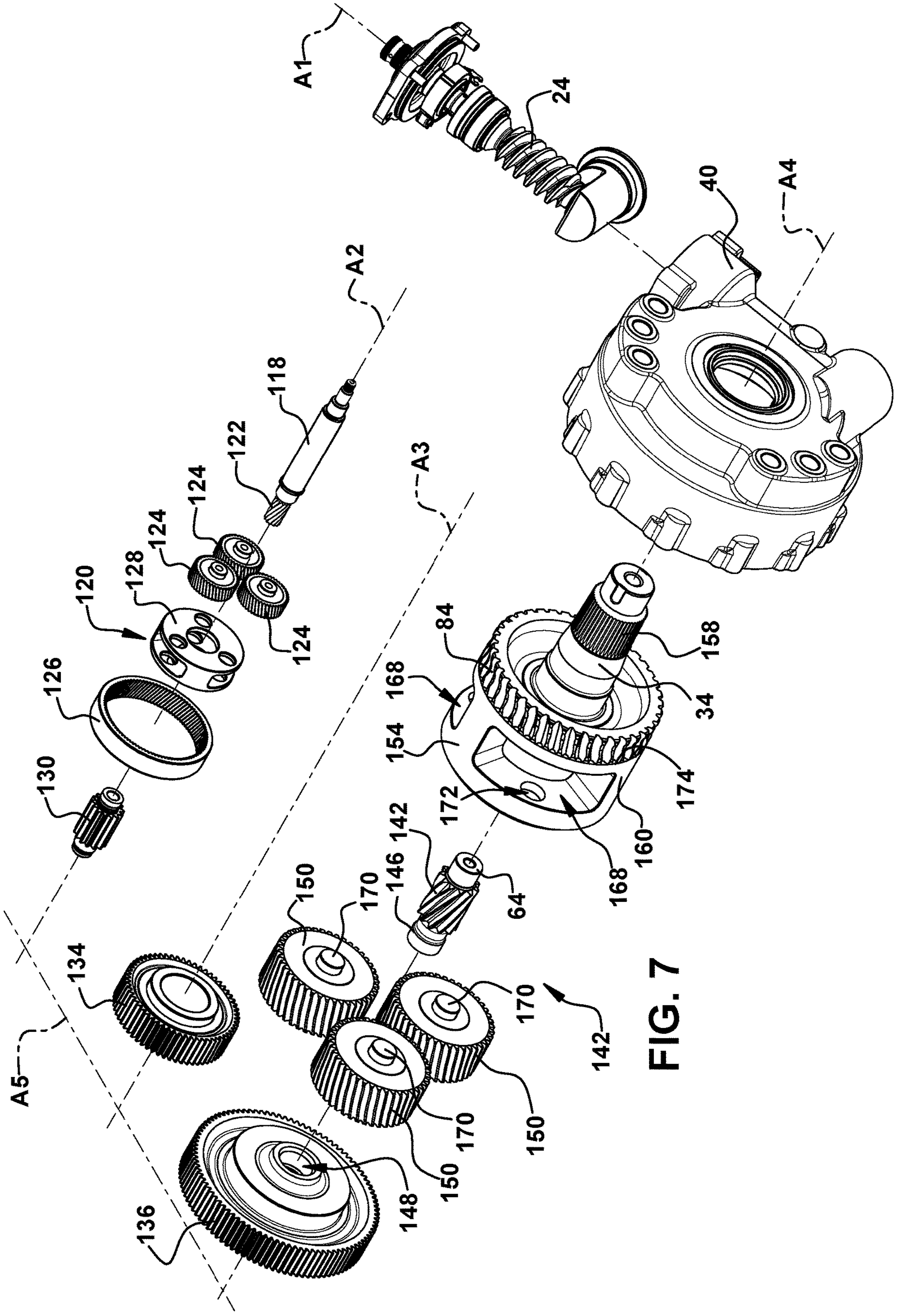
FIG. 7 is an exploded view of a portion of the EPS unit of FIG. 2.

As shown in FIGS. 6-7, the output shaft 118 extends along a second rotational axis A2 into the gearbox 70 and toward a first planetary gear stage 120. The first planetary gear stage 120 includes a sun gear 122 secured to the output shaft 118 and rotatable therewith. The sun gear 122 is formed integrally with the output shaft 118 as a single monolithic piece, though the sun gear may be formed separately from and subsequently attached to the output shaft. Planetary gears 124 are in meshed engagement with the sun gear 122 and with a ring gear 126 that is rotationally fixed in the housing 40. Rotating the output shaft 118 and secured sun gear 122 about the second rotational axis A2 responsively rotates or urges the planetary gears 124 to rotate and orbit the sun gear (and, accordingly, the second rotational axis) while maintaining their meshed engagement with the ring gear 126. Although three planetary gears 124 are shown, the first planetary gear stage 120 can include any number of planetary gears.

The planetary gears 124 are rotatably supported on a carrier 128 that rotates about the second rotational axis A2 as the planetary gears rotate and orbit the sun gear 122. The carrier 128 is radially spaced from the housing 40 and radially positioned between the sun gear 122 and the ring gear 126. The first planetary gear stage 120 can have a gear reduction ratio from the sun gear 122 to the carrier 128 of, for example, about 3:1 to about 10:1, though the second planetary gear stage can have any desired gear reduction ratio.

The first planetary gear stage 120 is operably connected to a second planetary gear stage 142 within the housing 40. However, unlike in typical gearbox arrangements, the first and second planetary gear stages 120, 142 are not directly connected to one another, nor are they aligned along a single axis. Instead, the first planetary gear stage 120 is operably connected in series with the second planetary gear stage 142 via one or more intermediate gears. The intermediate gear(s) thus transfer torque from the first planetary gear stage 120 to the second planetary gear stage 142. In other words, the one or more intermediate gears function as an intermediary for transferring rotation of the first planetary gear stage 120 to the second planetary gear stage 142.

As shown in FIGS. 6-7, the one or more intermediate gears can include a first intermediate gear 130 fixed for rotation with the carrier 128. The first intermediate gear 130 thus is rotatable with the carrier 128 about the second rotational axis A2. An end of the first intermediate gear 130 that is opposite the carrier 86 may be rotatably supported in the housing 40 by a bearing 132 (e.g., a ball bearing).

A second intermediate gear 134 is rotatably mounted in the housing 40 and is in meshed engagement with the first intermediate gear 130. Therefore, rotation of the first intermediate gear 130 responsively causes the second intermediate gear 134 to rotate about a third rotational axis A3.

A third intermediate gear 136 is rotatably supported in the housing 40 by bearings 138, 140. The third intermediate gear 136 is also in meshed engagement with the second intermediate gear 134. Rotation of the second intermediate gear 134 responsively causes the third intermediate gear 136 to rotate about a fourth rotational axis A4. Although only one intermediate gear 134 is shown between the first and third intermediate gears 130, 136, the gearbox 38 can include any number of intermediate gears between the first and third intermediate gears.

The second planetary gear stage 142 includes a sun gear 144 rotationally fixed to the third intermediate gear 136. In particular, the sun gear 144 may include a first end 146 that extends into an opening 148 of the third intermediate gear 136 where the first end engages with the third intermediate gear in a rotationally fixed manner. The sun gear 144 thus is rotatable with the third intermediate gear 136 about the fourth rotational axis A4. Planetary gears 150 are in meshed engagement with the sun gear 144 and teeth 152. The teeth 152 are on the housing 40 adjacent the second planetary gear stage 142 and extend circumferentially about the fourth rotational axis A4. The teeth 152 thus are formed integrally with the housing 40 as a single monolithic piece. However, the teeth 152 may be provided on a component (e.g., a ring gear) that is separate from and attached to the housing 40.

Rotating the sun gear 144 about the fourth rotational axis A4 responsively rotates or urges the planetary gears 150 to rotate and orbit the sun gear (and, accordingly, the fourth rotational axis) while maintaining meshed engagement with the teeth 152. Although three planetary gears 150 are shown, the second planetary gear stage 142 can include any number of planetary gears.

The planetary gears 150 are rotatably supported on a carrier 154 that rotates about the fourth rotational axis A4 as the planetary gears rotate and orbit the sun gear 144. The carrier 154 is radially spaced from the housing 40 and radially positioned between the sun gear 144 and the teeth 152. The second planetary gear stage 142 can have a gear reduction ratio from the sun gear 144 to the carrier 154 of, for example, about 3:1 to about 10:1, though the second planetary gear stage can have any desired gear reduction ratio. It will be appreciated that the gearbox 38 can include additional planetary gear stages (not shown) to achieve a desired gear reduction ratio through the gearbox.

The output shaft 34 is connected to the carrier 154 such that the carrier and the output shaft rotate together about the fourth rotational axis A4 relative to the housing 40. The output shaft 34 may be rotationally supported in the housing 40 by at least one bearing 156. The output shaft 34 extends out from the housing 40 and includes splines 158 outside the housing for connection to the steering linkage 26.

The worm wheel 84 is secured to the carrier 154 of the second planetary gear stage 142 and rotatable therewith about the fourth rotational axis A4. As a result, rotation of the steering wheel 22 is transferred to the output shaft 34 via the pinion 24, the worm wheel 84 and the carrier 154. Although the worm wheel 84 and its teeth are shown as extending completely circumferentially around the fourth rotational axis A4, the worm wheel may be configured such that the worm wheel and/or the teeth of the worm wheel extend(s) only partially circumferentially about the fourth rotational axis. For example, the worm wheel 84 and/or its teeth may extend about 150 degrees to about 180 degrees circumferentially around the fourth rotational axis A4, though the worm wheel 84 and/or its teeth may be configured to extend any desired amount of degrees around the fourth rotational axis.

Figure 8:
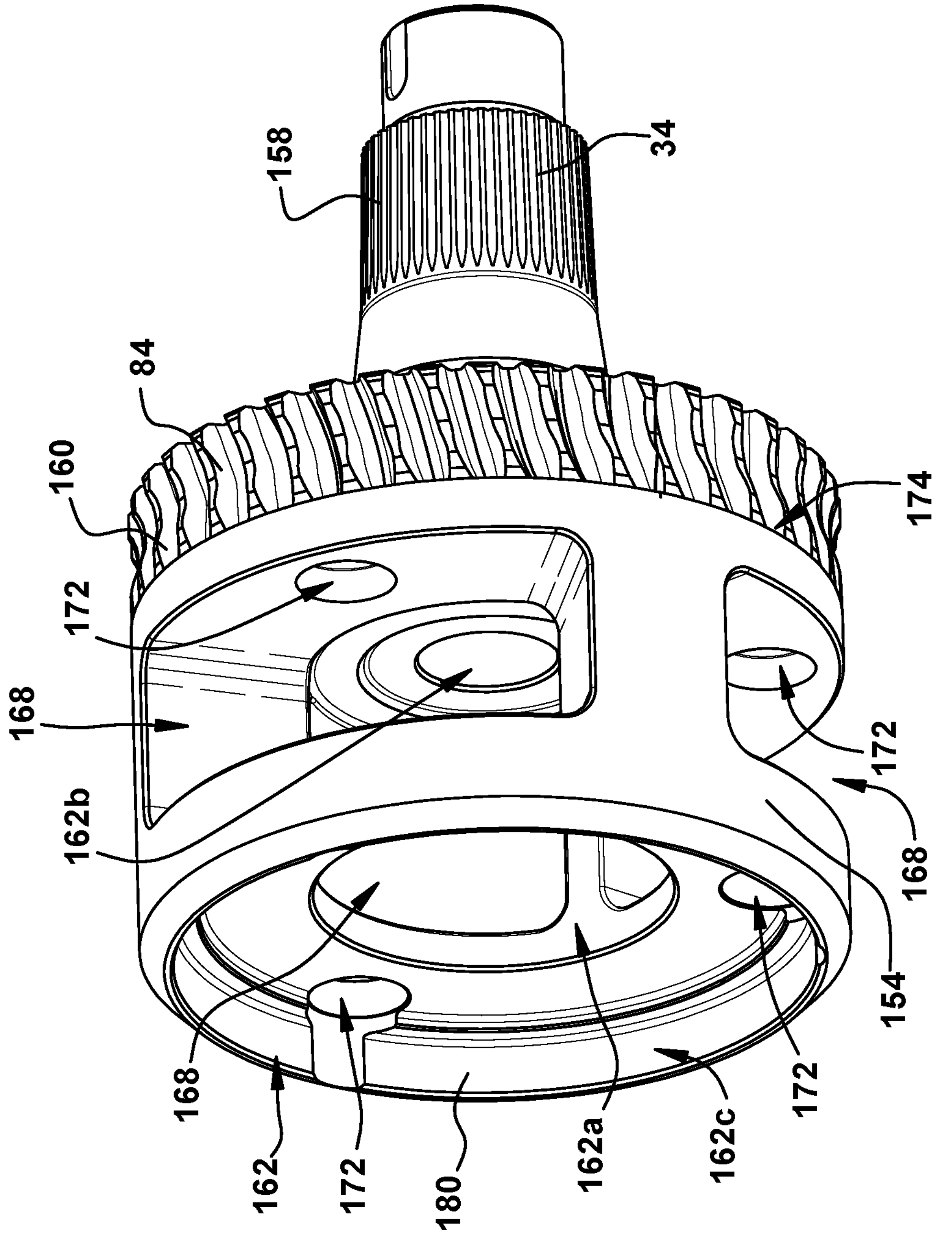
FIG. 8 is a front perspective view of an element of the EPS unit of FIG. 2.

As shown in FIGS. 6-8, the output shaft 34, the worm wheel 84 and the carrier 154 are integrally formed together as a single monolithic piece to define a one-piece output unit 160 of the gearbox 38. Forming the output shaft 34, the worm wheel 84 and the carrier 154 as a single piece helps reduce angular backlash in the gearbox 38 and eliminates any potential alignment issues between these parts that may otherwise occur if they were separate from one another. The carrier 154 (i.e., the carrier portion of the output unit) has a recess 162 into which the sun gear 144 extends. In particular, the sun gear 144 extends along the fourth rotational axis A4 through a first portion 162*a* of the recess 162 and into a second portion 162*b* of the recess, which may have a smaller diameter than the first portion. A second end 164 of the sun gear 144 may be rotatably supported in the second portion 162*b* of the recess 162 via a bearing 166 (e.g., a needle bearing) such that the sun gear and the carrier 154 can rotate about the fourth rotational axis A4 relative to one another.

The carrier 154 also includes circumferentially spaced windows 168 extending radially therethrough. The number of windows 168 may equal the number of planetary gears 150 as each planetary gear may be positioned in a corresponding window, though at least one of the windows may be configured to receive a plurality of planetary gears therein. The planetary gears 150 thus extend through the windows 168 such that they mesh with the sun gear 144 in the first portion 162*a* of the recess 162 and mesh with the teeth 152 that circumferentially surround the carrier 154. The planetary gears 150 are connected to the carrier 154 and maintained in the windows via shafts 170 that extend in the direction of the fourth rotational axis A4 through the windows 168. The shafts 170 can be supported in openings 172 on the carrier 154.

The carrier 154 further includes an axial end face 174 that faces in the direction the fourth rotational axis A4 away from the third intermediate gear 136. The output shaft 34 (i.e., the output shaft portion of the output unit 160) extends along the fourth rotational axis A4 from the axial end face 174. Therefore, one end of the output shaft 34 is connected to the carrier 154 (and to the worm wheel 84 via the carrier) housing 40, while the other end of the output shaft is outside the housing. The worm wheel 84 (i.e., the worm wheel portion of the output unit 160) also extends along the fourth rotational axis A4 from the axial end face 174 such that it at least partially circumferentially surrounds a portion of the output shaft 34. The worm wheel 84, being integrally formed as a part of the output unit 160, defines external teeth on the output unit that mesh with the pinion. The output unit 160 thus is urged to rotate about the fourth rotational axis A4 in response to torque from each of the steering wheel 22 and the motor 36.

Figure 9:
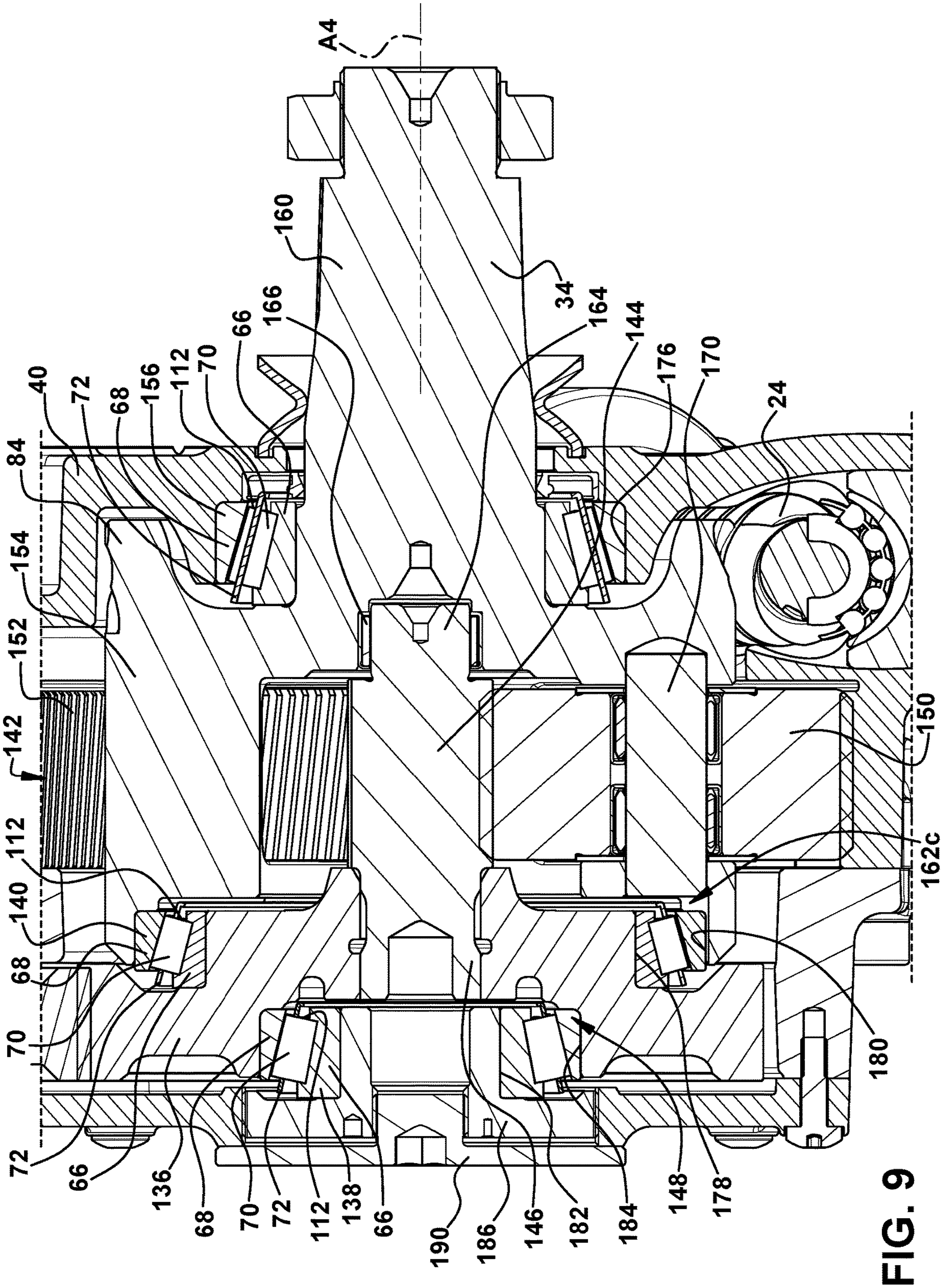
FIG. 9 is an isolated view of portion 9 of FIG. 6.

Referring to FIGS. 6 and 9, the output unit 160 is rotatably supported on one end (e.g., at or adjacent to the output shaft 34) via bearing 156 and on the other end (e.g., at or adjacent to the carrier 154) via bearing 140. In particular, the bearing 156 is a tapered roller bearing having an inner race or cone 66 circumferentially engaging the output shaft 34, an outer race or cup 68 circumferentially engaging an inner surface 176 of the housing 40, and a plurality of tapered rollers 70 interposed radially between the cone and the cup. The cone 66 may be rotationally fixed to the output shaft 34, while the cup 68 may be rotationally fixed to the inner surface 176. The cone 66 thus may rotate relative to the cup 68 as the output shaft 34 rotates relative to the housing 40. The bearing 156 may also include a cage 72 for its respective tapered rollers 70. At least a portion of the bearing 156 is radially between the output shaft 34 and the worm wheel 84, though the bearing may be provided on the outer shaft at any other desired location.

The bearing 140 is also a tapered roller bearing having an inner race or cone 66 circumferentially engaging the third intermediate gear 136 (e.g., an exterior shoulder 178 of the third intermediate gear), an outer race or cup 68 circumferentially engaging an inner surface 180 of the carrier 154, and a plurality of tapered rollers 70 interposed radially between the cone and the cup. The bearing 140 may also include a cage 72 for its respective tapered rollers 70. The inner surface 180 of the carrier 154 may define a third portion 162*c* of the recess 162, which may have a larger diameter than the first portion 162*a* of the recess. A portion of the third intermediate gear 136 extends into the recess 162 of the carrier 154 such that the inner surface 178 circumferentially surrounds the exterior shoulder 180 of the third intermediate gear 136. The bearing 140 thus is radially between the carrier 154 and the third intermediate gear 136. The cone 66 may be rotationally fixed to the exterior shoulder 180 of the third intermediate gear 136, while the cup 68 may be rotationally fixed to the inner surface 180 of the carrier 154. In such case, the cone 66 and the cup 68 rotate relative to one another as the carrier 154 and the third intermediate gear 136 rotate relative to one another.

Accordingly, the carrier 154 (and, thus, the output unit 160) and the third intermediate gear 136 are rotatably supported on one another via the bearing 140. The third intermediate gear 136 is also rotatably supported in the housing 40 via bearing 138. The bearing 138 is a tapered roller bearing having an inner race or cone 66 circumferentially engaging a support surface 182 in the housing 40, an outer race or cup 68 circumferentially engaging an inner surface 184 of the third intermediate gear 136, and a plurality of tapered rollers 70 interposed radially between the cone and the cup. The bearing 138 may also include a cage 72 for its respective tapered rollers 70. The inner surface 184 of the third intermediate gear 136 may define a portion of the third intermediate gear's opening 148. The support surface 182 may be on a support plate 186 that is inserted and rotationally fixed in the housing 40. The support plate 186 may be at least partially maintained within the housing 40 via a cap 190 and/or via a threaded interface between the support plate and the housing. A portion of the support surface 182 extends into the opening 148 such that the inner surface 184 of the third intermediate gear 136 circumferentially surrounds the support surface. The bearing 138 thus is radially between the support plate 186 and the third intermediate gear 136. The cone 66 may be rotationally fixed to the support surface 182, while the cup 68 may be rotationally fixed to the inner surface 184 of the third intermediate gear 136. In such case, the cup 68 rotates relative to the cone 66 as the third intermediate gear 136 rotates relative to the support plate 186.

In view of the above, it can be appreciated that the output unit 160 is rotatably supported on the housing 40 via bearing 156, the third intermediate gear 136 is rotatably supported on the support plate 186 via bearing 138, and the output unit and third intermediate gear are rotatably supported on one another via bearing 140. Accordingly, the output unit 160 and the third intermediate gear 136 are supported in the housing 40 primarily via the bearings 138, 140, 156. Although bearing 166 is positioned radially between the carrier 154 and the sun gear 144, this bearing is not provided to support the output unit 160. In fact, in certain configurations of the gearbox 38, the bearing 166 may be omitted. In such configurations, the sun gear 144 may terminate outside the second portion 162*b* of the recess 162 (e.g., the sun gear's second end 164 may be located in the first portion 162*a* of the recess), and the second portion of the recess may be omitted altogether.

However, in the gearbox 38 configuration shown in FIGS. 6 and 9, the first end 146 of the sun gear 144 is rotationally fixed to the third intermediate gear 136 and the second end 164 of the sun gear extends into the carrier 154 where it is rotatably supported via the bearing 166 such that the sun gear and the output unit 160 can rotate relative to one another. Extending the sun gear 144 into the carrier helps maintain the output unit 160 and the third intermediate gear 136 in alignment on the fourth rotational axis A4. The output unit 160 (e.g., the carrier 154) and/or third intermediate gear 136 deflecting out of alignment may increase the stress on bearings 138, 140, 156. The sun gear's 144 connection to the carrier 154 via the bearing 166 thus helps to reduce stress on the bearings 138, 140, 156 by at least partially maintaining the output unit 160 and the third intermediate gear 136 in proper alignment. Accordingly, instead of being provided for support purposes like the bearings 138, 140, 156, the bearing 166 is provided for alignment and stress purposes.

It should be appreciated that, although any of the bearings 138, 140, 156 could be a different type of bearing (e.g., a ball bearing, an angular contact ball bearing, a spherical roller bearing, a cylindrical roller bearing or a needle roller bearing), having the bearings be tapered roller bearings provides certain advantages. For example, ball bearings have point contact between their balls and each of the inner and outer races, while tapered roller bearings have line contact between the tapered rollers and each of the cones and cups. Line contact provides for a better stress distribution in bearings than point contact because loads/stress in the bearings are spread across a relatively large area as opposed to being applied to a single point. Furthermore, tapered roller bearings are designed for supporting relatively high axial and radial loads. If the bearings 138, 140, 156 were ball or angular ball bearings, they would have to be much larger than they currently are in order to provide the same axial/radial load support as they provide in their tapered roller bearing form.

Typically, the EPS unit 16, or at least the gearbox 38 thereof, is mounted to a support structure (e.g., a frame) of a vehicle between the support structure and one of the steerable vehicle wheels 12 such that an axial width 188 of the EPS unit 16 extends between the frame and the steerable vehicle wheel. The axial space between the frame and the steerable vehicle wheel can be quite limited. Therefore, to reduce the axial width 188 of the EPS unit 16, the EPS unit, via the intermediate gears 130, 134, 136, splits the motor 36, the output shaft 118 and the first planetary gear stage 120 onto a different rotational axis than the second planetary gear stage 142 and the output unit 160. Arranging the motor 36, the output shaft 118, the first planetary gear stage 120, the second planetary gear stage 142 and the output unit 160 on a single rotational axis would substantially increase the axial width 188 of the EPS unit 16. Therefore, the particular arrangement of the features of the EPS unit 16 results in the axial width 188 being less than what would otherwise be possible.

Figure 10:
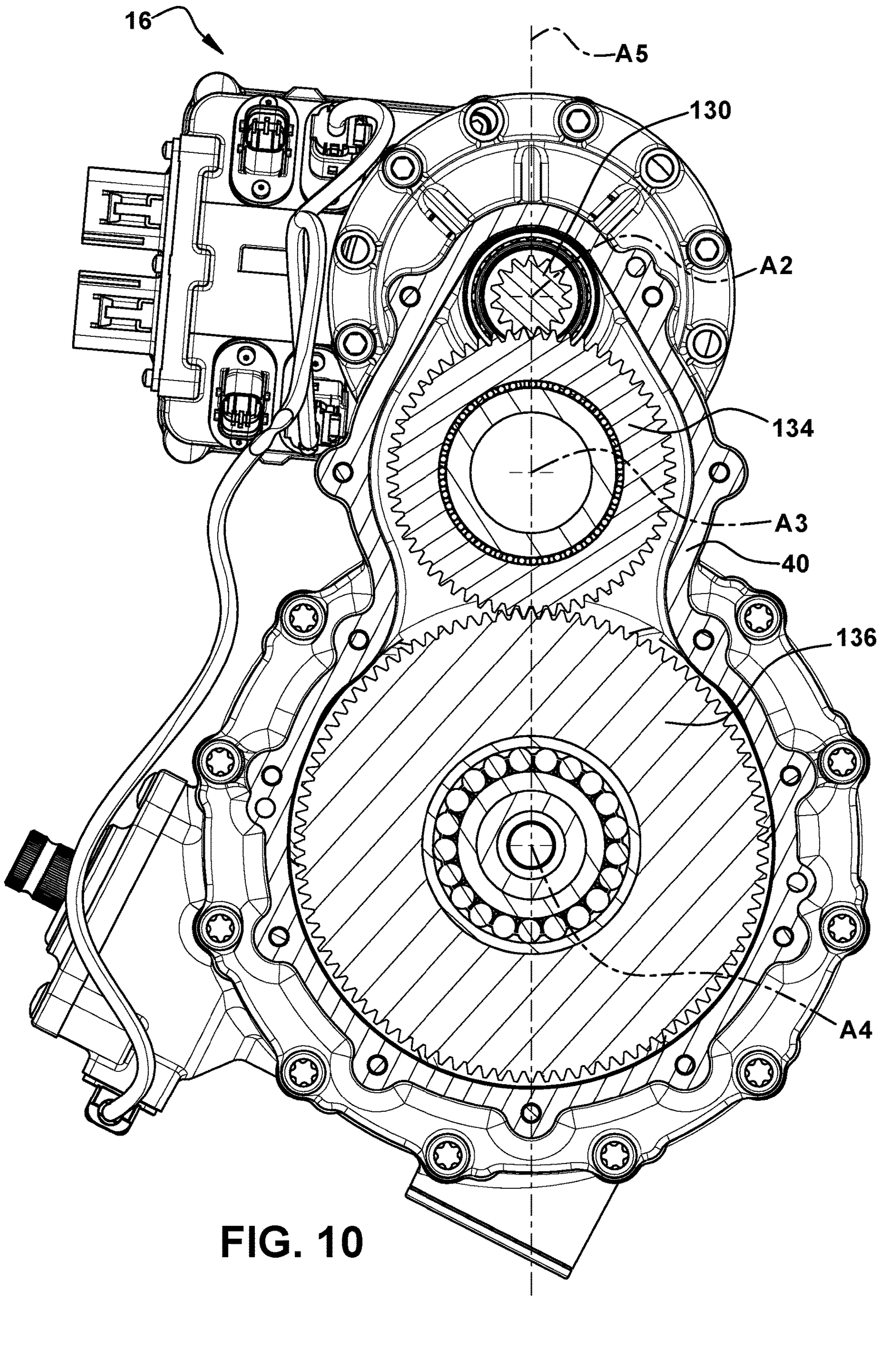
FIG. 10 is a cross-sectional view taken along line 10-10 of FIG. 2.

Furthermore, as shown in FIGS. 7 and 10, each of the rotational axes A2, A3, A4 may intersect a singular alignment axis A5 that extends transverse (e.g., perpendicularly) to each of the rotational axes A2, A3, A4. Because of this alignment, other dimensions of the gearbox 38 (e.g., a depth dimension of the gearbox that is substantially perpendicular to the gearbox's axial width 188) may be kept relatively small without increasing the axial width. Although the first, second and third rotational axes A2, A3, A4 are shown as being parallel to one another, at least one of the rotational axes A2, A3, A4 may be at an angle with respect to at least one other of the rotational axes A2, A3, A4 and/or may be offset from the alignment axis A5.

During operation, the operator rotates the steering wheel 22 to thereby urge the pinion 24 to rotate about the first rotational axis A1. This, in turn, urges the worm wheel 84 to rotate (and, accordingly, the output unit 160) about the fourth rotational axis A4. At the same time, the controller 114, in response to signals received from the vehicle condition sensor(s) 116, actuates the motor 36 to rotate the output shaft 118 about the second rotational axis A2, which urges the carrier 128 to rotate about the second rotational axis via the sun gear 122 and the planetary gears 124. As a result, the first intermediate gear 130 fixed to the carrier 128 is also urged to rotate about the second rotational axis A2.

The rotating first intermediate gear 130 urges the second intermediate gear 134 to rotate about the third rotational axis A3, which responsively urges the third intermediate gear 136 to rotate about the fourth rotational axis A4. The sun gear 144, being rotationally fixed to the third intermediate gear 136, rotates with the third intermediate gear 136 about the fourth rotational axis A4. The sun gear 144 urges the carrier 154 (and, thus, the attached output shaft 34) to rotate about the fourth rotational axis A4 via the planetary gears 150. Therefore, force from the motor 36 is transferred through the various features to the output shaft 34. A total gear reduction ratio from the output shaft 118 of the motor 36 to the output shaft 34 may be, for example, about 75:1 to about 600:1, though the gearbox 38 may be configured to have any desired total gear reduction ratio.

As shown in FIG. 1, when the output shaft 34 rotates about the fourth rotational axis A4, the first steering member 28 secured thereto likewise urged to rotate about the fourth rotational axis A4. The first steering member 28 moves the second steering member 30 in the manner L, which pivots the third steering member 32 in the manner R to steer (e.g., turn) the vehicle wheels 12.

In addition to providing steering assist, the EPS unit 16, via its connection of the motor 36 to the steering wheel 22, may be configured to provide feedback or steering feel to the operator.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

Having described the invention, the following is claimed:

1. A steering system for use in turning steerable vehicle wheels, the steering system comprising:
- a housing;
- an electric motor;
- a gear in the housing and rotatable relative to the housing via the electric motor;
- a planetary gear stage in the housing, the planetary gear stage having a sun gear, a planetary gear meshed with the sun gear, and a carrier connected to the planetary gear, rotation of the gear urging the sun gear to rotate about an axis, rotation of the sun gear urging the planetary gear to rotate relative to the housing and orbit the sun gear, the carrier being urged to rotate about the axis in response to the planetary gear rotating relative to the housing and orbiting the sun gear; and
- a bearing having a first race on the gear and a second race on the carrier, the gear and the carrier being rotatably supported in the housing on one another via the bearing.

2. The steering system of claim 1, further comprising a second bearing rotatably supporting the gear on a support surface in the housing.

3. The steering system of claim 2, wherein an outer race of the second bearing is on the gear and an inner race of the second bearing is on the support surface.

4. The steering system of claim 3, wherein the support surface is on a support plate in the housing, the outer race being on an inner surface of the gear, the inner surface circumferentially surrounding the support surface.

5. The steering system of claim 1, further comprising an output shaft rotatable relative to the housing via the carrier, the output shaft being coupled to steerable vehicle wheels such that rotation of the output shaft affects steering of the steerable vehicle wheels.

6. The steering system of claim 5, further comprising a second bearing rotatably supporting the output shaft on an inner surface of the housing.

7. The steering system of claim 6, wherein an outer race of the second bearing is on the housing and an inner race of the second bearing is on the output shaft.

8. The steering system of claim 6, wherein the output shaft is integrally formed with the carrier as a single monolithic piece, the single piece output shaft and carrier being rotatably supported in the housing via both the bearing and the second bearing.

9. The steering system of claim 6, wherein further comprising a third bearing rotatably supporting the gear on a support surface in the housing.

10. The steering system of claim 9, wherein the first, second and third bearings are tapered roller bearings.

11. The steering system of claim 9, wherein the gear, the carrier, and the output shaft are rotatably supported in the housing only via the first, second and third bearings.

12. The steering system of claim 9, wherein a first end of the sun gear is rotationally fixed to the gear in an opening of the gear, a second end of the sun gear being rotatably supported in a recess of the carrier via a fourth bearing such that the sun gear and the carrier are rotatable relative to one another.

13. The steering system of claim 1, wherein the carrier is coupled to steerable vehicle wheels such that rotation of the carrier affects steering of the steerable vehicle wheels.

14. The steering system of claim 1, wherein the sun gear is rotationally fixed to the gear and rotatably supported in a recess of the carrier via a second bearing such that the sun gear and the carrier are rotatable relative to one another.

15. The steering system of claim 1, wherein the bearing is a tapered roller bearing having tapered rollers between the first and second races.

16. The steering system of claim 1, wherein the first race is on an exterior shoulder of the gear, the second race being on an inner surface of carrier.

17. The steering system of claim 1, wherein the housing includes teeth meshed with the planetary gear.

18. The steering system of claim 1, further comprising a second planetary gear stage in the housing, the second planetary gear stage having a second sun gear, a second planetary gear meshed with the second sun gear, and a second carrier connected to the second planetary gear, the second carrier being operably connected to the gear such the motor urges the gear to rotate via the second planetary gear stage.

19. The steering system of claim 18, further comprising:
- a second gear in the housing and fixed for rotation with the second carrier; and
- a third gear in the housing and meshing with the gear and the second gear.

20. The steering system of claim 1, wherein the carrier is coupled to steerable vehicle wheels by an output shaft such that rotation of the carrier and the output shaft affects steering of the steerable vehicle wheels, the gear being axially spaced from the output shaft.

* * * * *